US007653249B2

(12) United States Patent
Loui et al.

(10) Patent No.: US 7,653,249 B2
(45) Date of Patent: Jan. 26, 2010

(54) VARIANCE-BASED EVENT CLUSTERING FOR AUTOMATICALLY CLASSIFYING IMAGES

(75) Inventors: Alexander C. Loui, Penfield, NY (US); Bryan D. Kraus, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 960 days.

(21) Appl. No.: 10/997,411

(22) Filed: Nov. 17, 2004

(65) Prior Publication Data

US 2006/0126944 A1 Jun. 15, 2006

(51) Int. Cl.
*G06K 9/62* (2006.01)
*H04N 5/76* (2006.01)

(52) U.S. Cl. .................... 382/224; 348/231.3

(58) Field of Classification Search .................. 382/224
See application file for complete search history.

(56) References Cited

U.S. PATENT DOCUMENTS

| | | | | |
|---|---|---|---|---|
| 6,091,841 | A * | 7/2000 | Rogers et al. | 382/132 |
| 6,104,835 | A * | 8/2000 | Han | 382/225 |
| 6,240,424 | B1 * | 5/2001 | Hirata | 707/104.1 |
| 6,249,252 | B1 * | 6/2001 | Dupray | 342/450 |
| 6,351,556 | B1 * | 2/2002 | Loui et al. | 382/164 |
| 6,404,925 | B1 * | 6/2002 | Foote et al. | 382/224 |
| 6,606,411 | B1 * | 8/2003 | Loui et al. | 382/224 |
| 6,636,648 | B2 * | 10/2003 | Loui et al. | 382/284 |
| 6,650,766 | B1 * | 11/2003 | Rogers et al. | 382/132 |
| 6,657,661 | B1 * | 12/2003 | Cazier | 348/231.2 |
| 7,007,243 | B2 * | 2/2006 | Baldino | 715/853 |
| 2001/0015759 | A1 * | 8/2001 | Squibbs | 348/232 |
| 2002/0044690 | A1 * | 4/2002 | Burgess | 382/209 |
| 2002/0159642 | A1 * | 10/2002 | Whitney | 382/225 |
| 2002/0167408 | A1 * | 11/2002 | Trajkovic et al. | 340/573.1 |
| 2002/0186412 | A1 * | 12/2002 | Murashita | 358/1.16 |
| 2002/0188602 | A1 * | 12/2002 | Stubler et al. | 707/3 |
| 2003/0048950 | A1 * | 3/2003 | Savakis et al. | 382/225 |
| 2003/0128877 | A1 * | 7/2003 | Nicponski | 382/224 |
| 2003/0147558 | A1 * | 8/2003 | Loui et al. | 382/225 |
| 2004/0111415 | A1 * | 6/2004 | Scardino et al. | 707/10 |
| 2004/0174443 | A1 * | 9/2004 | Simske | 348/231.3 |

FOREIGN PATENT DOCUMENTS

EP 0 990 996 A2 4/2000

OTHER PUBLICATIONS

Automated Even Clustering and Quality Screening of Consumer Pictures for Digital Albuming, IEEE Transactions on Multimedia, vol. 5, No. 3, Sep. 2003, pp. 390-402.*

(Continued)

*Primary Examiner*—Bhavesh M Mehta
*Assistant Examiner*—David P Rashid
(74) *Attorney, Agent, or Firm*—Robert L. Walker (57) ABSTRACT

In an image classification method, a plurality of grouping values are received. The grouping values each have an associated image. An average of the grouping values is calculated. A variance metric of the grouping values, relative to the average is computed. A grouping threshold is determined from the variance metric. Grouping values beyond the grouping threshold are identified as group boundaries. The images are assigned to a plurality of groups based upon the group boundaries.

9 Claims, 7 Drawing Sheets

OTHER PUBLICATIONS

An Efficient k-Means Clustering Algorithm: Analysis and Implementation, IEEE Transactions on Pattern Analysis and Machine Intelligence, vol. 24, No. 7, Jul. 2002, pp. 881-892.*

Alexander C. Loui and Andrea Savakis, "Automated Event Clustering and Quality Screening of Consumer Pictures for Digital Albuming" IEEE Transactions on Multimedia, vol. 5, No. 3, Sep. 2003, pp. 390-402, XP002374762, USA.

"Home Photo Content Modeling for Personalized Event-Based Retrieval", Joo-Hwee Lim et al., IEEE MultiMedia, IEEE Computer Society, vol. 10 (4), Oct.-Dec. 2003, pp. 28-37.

* cited by examiner

VARIANCE-BASED EVENT CLUSTERING FOR AUTOMATICALLY CLASSIFYING IMAGES

CROSS REFERENCE TO RELATED APPLICATIONS

Reference is made to commonly-assigned copending U.S. Patent Application Publication No. 2003/198390 published Oct. 23, 2003, entitled "A Method for Automatically Classifying Images into Events" and filed 15 Apr. 2003 in the names of Alexander C. Loui and Eric S. Pavie, and commonly-assigned copending U.S. Pat. No. 6,865,297 issued Mar. 8, 2005, entitled "A Method for Automatically Classifying Images into Events" and filed 12 Nov. 2003 in the names of Alexander C. Loui, and Eric S. Pavie, and commonly-assigned copending U.S. Pat. No. 7,298,895 issued Nov. 20, 2007, entitled "A Method for Automatically Classifying Images into Events" and filed 29 Oct. 2003 in the names of Alexander C. Loui, and Eric S. Pavie, all of which are incorporated herein by reference.

FIELD OF THE INVENTION

The invention relates to digital image processing that automatically classifies images and more particularly relates to variance-based event clustering.

BACKGROUND OF THE INVENTION

The rapid proliferation of digital images has increased the need to classify images for easier retrieving, reviewing, and albuming of the images. Manual classification is effective, but is slow and burdensome unless the number of images is small. Automated methods are available, but tend to have a number of constraints, such as requiring extensive processing resources. As a result, the suitability of different automated methods tends to depend upon a particular use and type of classification. One type of classification is by event.

Some automated methods partition images into groups having similar image characteristics based upon color, shape or texture. This approach can be used to classify by event, but is inherently difficult when used for that purpose. "Home Photo Content Modeling for Personalized Event-Based Retrieval", Lim, J-H, et al., *IEEE Multimedia*, Vol. 10(4), October-December 2003, pages 28-37 discloses classification of images by event using image content.

Many images are accompanied by metadata, that is, associated non-image information, that can be used to help grouping the images. One example of such metadata is chronological data, such as date and time, and geographic data, such as Global Positioning System ("GPS") geographic position data. These types of data are particularly suitable for grouping by event, since events are limited temporally and usually limited spatially. Users have long grouped images manually by looking at each image and sorting by chronology and geography. The above-cited article by Lim et al., suggests use of chronological and geographic data in automated image classification by event using image content.

Statistical techniques are well known for classifying data using metrics related to variance, such as: standard deviation, variance, mean deviation, and sample variation.

It would thus be desirable to provide simple and efficient image classification using variance-based techniques with grouping data, such as chronological or geographical data.

SUMMARY OF THE INVENTION

The invention is defined by the claims. The invention, in broader aspects, provides an image classification method, in which a plurality of grouping values are received. The grouping values each have an associated image. An average of the grouping values is calculated. A variance metric of the grouping values, relative to the average is computed. A grouping threshold is determined from the variance metric. Grouping values beyond the grouping threshold are identified as group boundaries. The images are assigned to a plurality of groups based upon the group boundaries.

It is an advantageous effect of the invention that improved methods, computer programs, and systems are provided, which achieve simple and efficient image classification using variance-based techniques with grouping data, such as chronological or geographical data.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the methods, a set of grouping values associated with individual digital images are received and averaged. A variance metric relative to the average is computed and a grouping threshold is determined. Grouping values beyond the threshold are identified as grouping boundaries and images are assigned to groups based upon the grouping boundaries.

In the following description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 9:
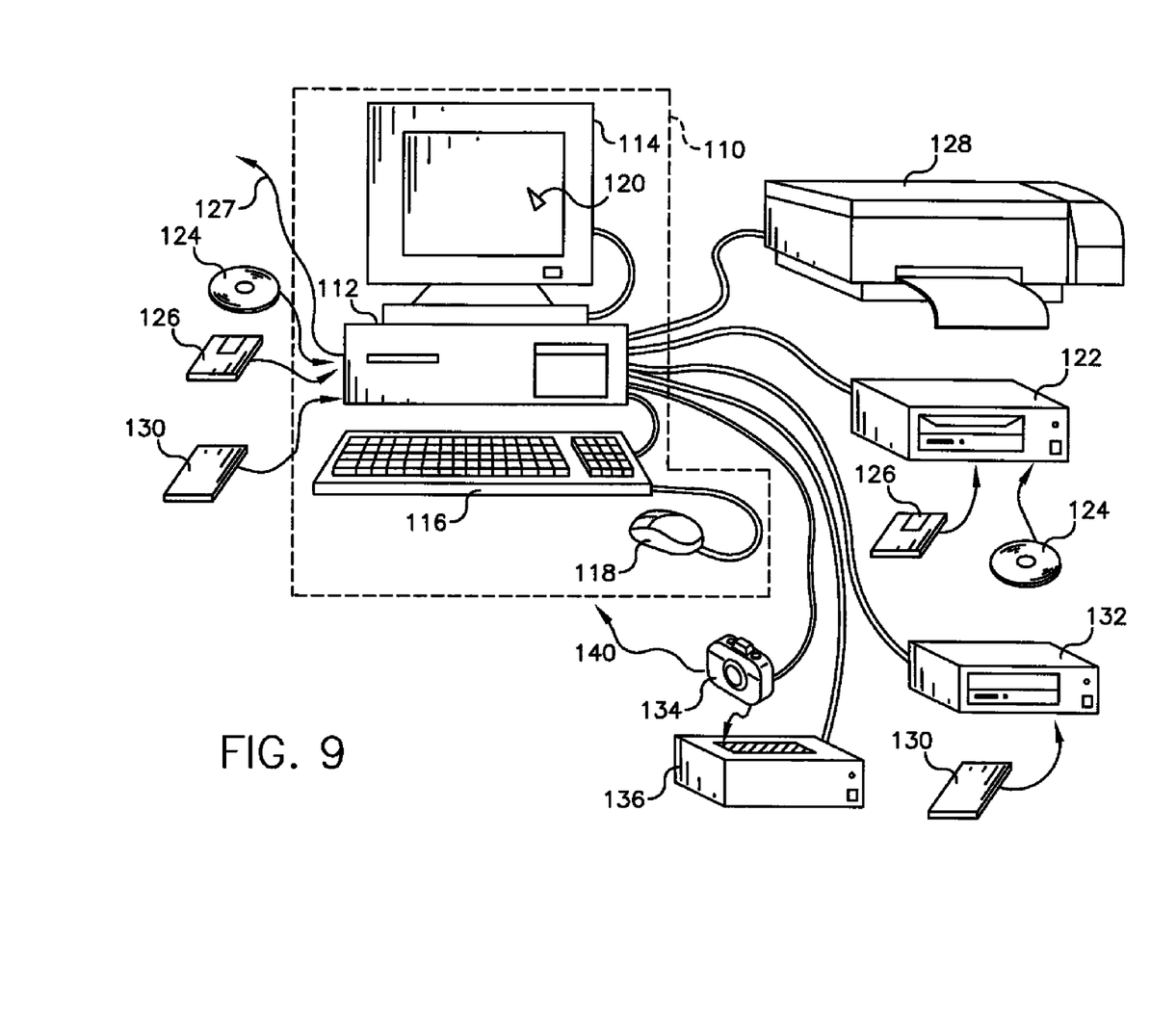
FIG. 9 is a diagrammatical view of an embodiment of the apparatus.

The present invention can be implemented in computer hardware and computerized equipment. For example, the method can be performed in a digital camera, a digital printer, and on a personal computer. Referring to FIG. 9, there is illustrated a computer system 110 for implementing the present invention. Although the computer system 110 is shown for the purpose of illustrating a preferred embodiment, the present invention is not limited to the computer system 110 shown, but may be used on any electronic processing system such as found in digital cameras, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 9 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

The general control computer shown in FIG. 9 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention can be utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 9 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

In the image classification methods, images are classified into groups and optionally into subgroups, and then into subsets. The terms "subgroup" and "subset" are used as a convenience. These classifications could, alternatively, all be referred to by the term "group". The methods are particularly suitable for image classifications in which each such group represents an event or sub-event. The term "event" is defined herein as a significant occurrence or happening as perceived by the subjective intent of the user.

The methods classify using grouping values associated and/or derived from the individual images. The grouping values can represent or be derived from metadata, that is, non-image information that is associated with individual images in some manner that permits transfer of the information along with the images. For example, metadata is sometimes provided within the same file as image information. Examples of such information include: date, time, flash firing, illuminant type, lens focal length, GPS data, camera type, camera serial number, and user name.

The "grouping values" can represent non-image information of any kind that can be presented in numerical form. The methods are most beneficial for the grouping of images by events using non-image information that can have a large number of possible values, such as chronological data and geographic data. Such data can be generalized as providing a difference from a reference or a difference internal to the data.

The difference can be relative to an established standard, such as the date and time or GPS geographic coordinates. The difference can also be relative to an arbitrary reference. (For convenience, much of the following discussion relates to grouping values based upon chronology and/or geography.) For example, one or several cameras can be synchronized to an arbitrary reference time. Likewise, a particular GPS coordinate set can be selected as an arbitrary starting point for later distance measurements. The reference itself does not have to be fixed in time or place. Distances can be relative to a reference camera or other movable feature. In the same manner, times can be measured in differences from a particular reference time or closest of a sequence of reference times. For example, images can be provided by a plurality of independently operated cameras. The movable reference can be a designated one of the cameras. In this case, the reference camera can have different absolute spatial locations when images are captured by the other cameras and the differences can be separations from the reference camera at the times of capture of different images.

Internal differences for a set of images can be differences of an image from one or more other neighboring or otherwise related images in the set. Convenient differences are from nearest neighbors or the preceeding image in an ordered sequence. Metadata from images captured originally on film generally includes this information. Digital cameras commonly assign filenames to images in a sequential manner. Specific examples of internal differences include elapsed time and distance from a previous image.

In the methods, the grouping values are received and averaged. The grouping values would generally be provided along with associated image files, but can be separated from image files, if information associating grouping values and individual images is not lost.

The averaging, in the embodiments disclosed herein, provides an arithmetic mean. Other "averages", such as median and mode, can be used as appropriate for a particular variance metric and a particular use.

The grouping values are optionally scaled with a scaling function prior to averaging. The scaling function is a continuous mathematical function that is invertible and has a positive, decreasing slope. As a result, the scaling function maintains small grouping value differences and compresses large grouping value differences. A scaling function for a particular use can be determined heuristically.

The grouping values can be arranged in a histogram, which is modified, using the scaling function, to provide a scaled histogram. The histogram can be used to provide a visual check of the groups provided by the method.

The computing of the variance metric from the grouping values is in accordance with ordinary statistical procedures. The variance metric is a statistical parameter related to the variance of a set of values relative to a particular average. Examples of suitable variance metrics include: standard deviation, variance, mean deviation, and sample variation.

The grouping threshold is set relative to the variance metric. For example, when the variance metric is the standard deviation, the grouping threshold is a multiple of standard deviation. A suitable grouping threshold for a particular use can be determined heuristically using an exemplary set of images.

After the grouping threshold is determined, grouping values beyond the event threshold are identified as grouping boundaries and images are assigned to groups based upon those grouping boundaries. For example, in a particular embodiment, any time difference that diverges from a set average by more than a preselected number of standard deviations is considered an event boundary and images are grouped in accordance with those boundaries. Additional grouping boundaries can be provided by additional grouping thresholds that are larger multiples of the original grouping threshold. For example, an initial grouping threshold t can be used with additional grouping thresholds at kt, 2kt . . . nkt standard deviations.

In performing the method, the scaled histogram can be checked to confirm that the selected scaling function has not obscured grouping value differences that lie below the grouping threshold and has compressed the differences between the grouping values that lie beyond the grouping threshold, and, thus, the selected scaling function is appropriate for the grouping values of a particular image set.

Figure 1:
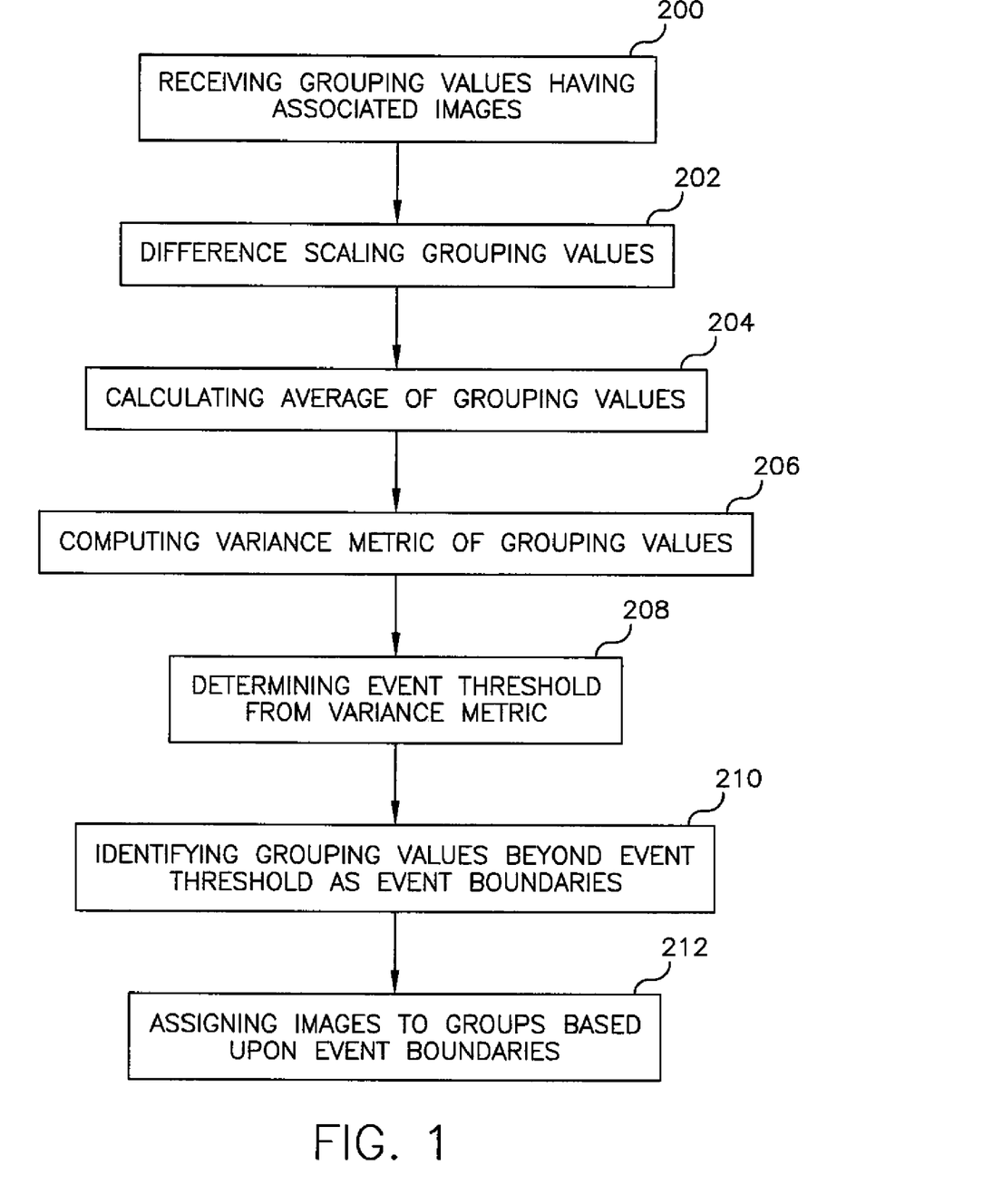
FIG. 1 is a flow chart of an embodiment of the method of the invention.
Figure 4:
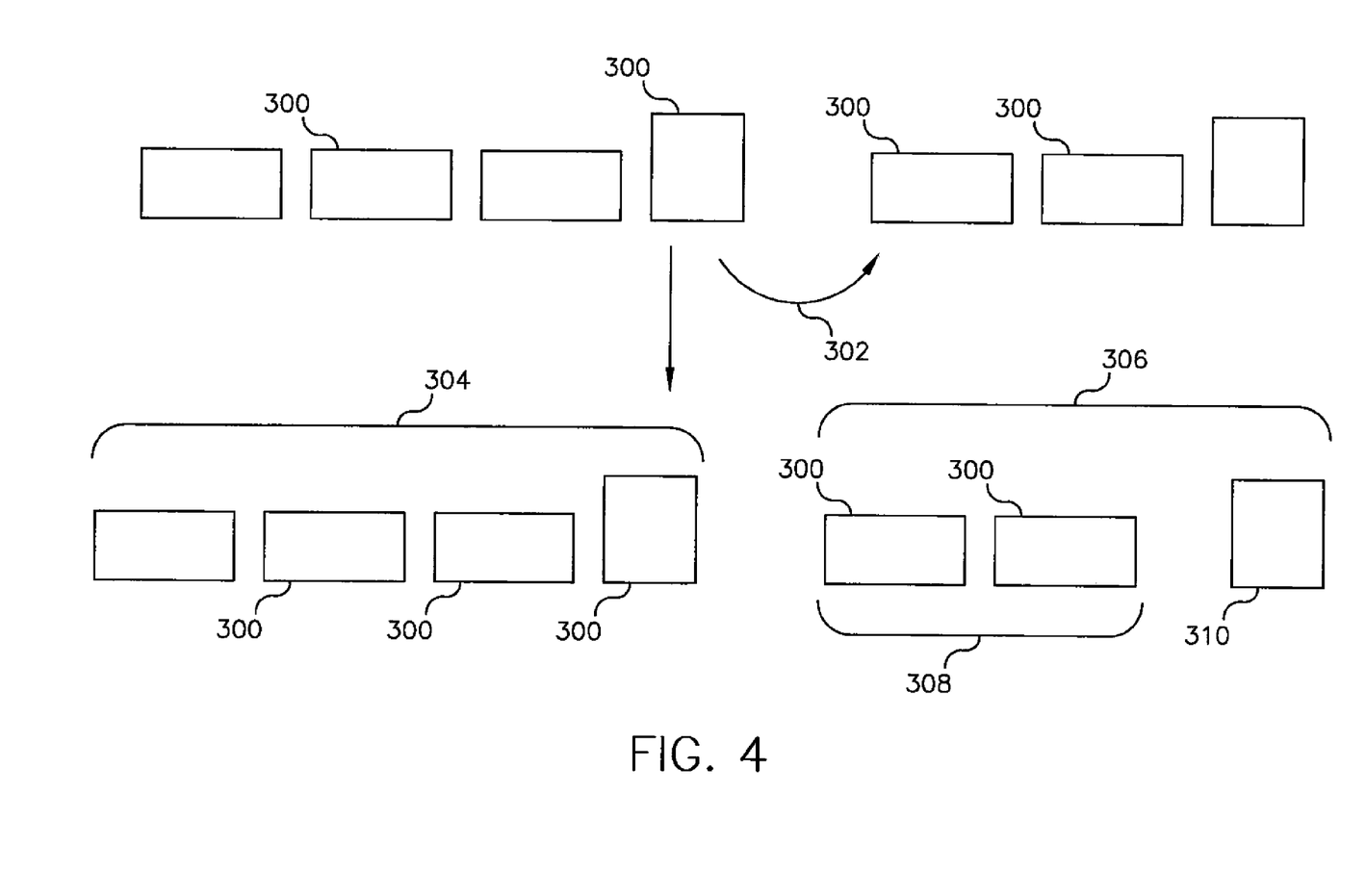
FIG. 4 is a diagram of classification of images into events and sub-events using the method of FIG. 2.
Figure 5:
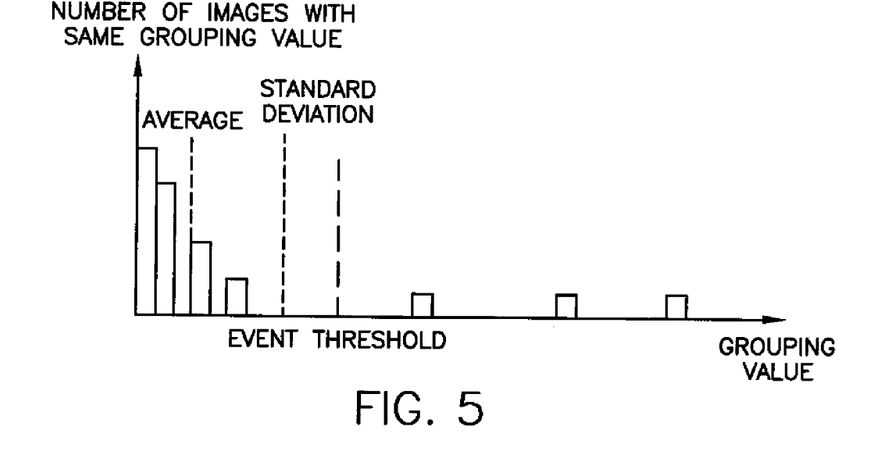
FIG. 5 is a diagram showing a scaled histogram of grouping values of a set of images and, imposed on the histogram, the average, standard deviation, and event threshold.
Figure 8:
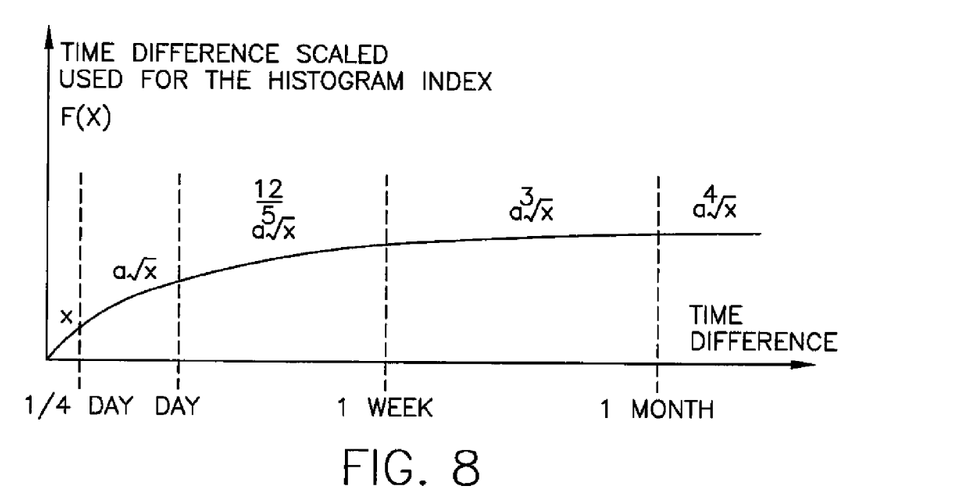
FIG. 8 is a diagram of a scaling function used to provide the scaled histogram of FIG. 5.

Referring now to FIGS. 1 and 4-5, in a particular embodiment, images are grouped using capture time information. The grouping values associated with the images are received (200), a time difference histogram is prepared, and the time difference histogram is mapped (202) using a time difference scaling function, shown in FIG. 8, to provide a scaled histogram, shown in FIG. 5. The average is calculated (204) and standard deviation of the set of scaled time differences is computed (206), as shown in FIG. 5, and the event threshold is determined (208). The time differences beyond the event threshold (to the right of the event threshold in FIG. 5) are identified (210) as event boundaries. Images associated with time differences within the event threshold (to the left of the event threshold in FIG. 5) are assigned (212) to groups bounded by the event boundaries.

This embodiment is particularly useful for grouping images captured with a number of independently operated cameras, all of which record date and time as metadata with images, but which lack real-time clock synchronization between the different cameras. In this case, minor errors in the time/date clocks of one or more cameras will not effect grouping based on significantly longer events.

An event threshold was determined heuristically for classification of captured images of social events using actual (clock) time or elapsed time relative to a time reference that provides a common origin. This determination used about 150 sets of consumer images, each set averaging about 40-80 photographs of day-to-day consumer events including vacations, school events, weddings, graduations, and the like. The event threshold was determined to follow the function:

$$\text{Event threshold} = 0.2 + 8.159 e^{(-0.0002 * ((standard\ deviation)^2))}$$

The function was derived from test data to group events in the various image sets.

Figure 7:
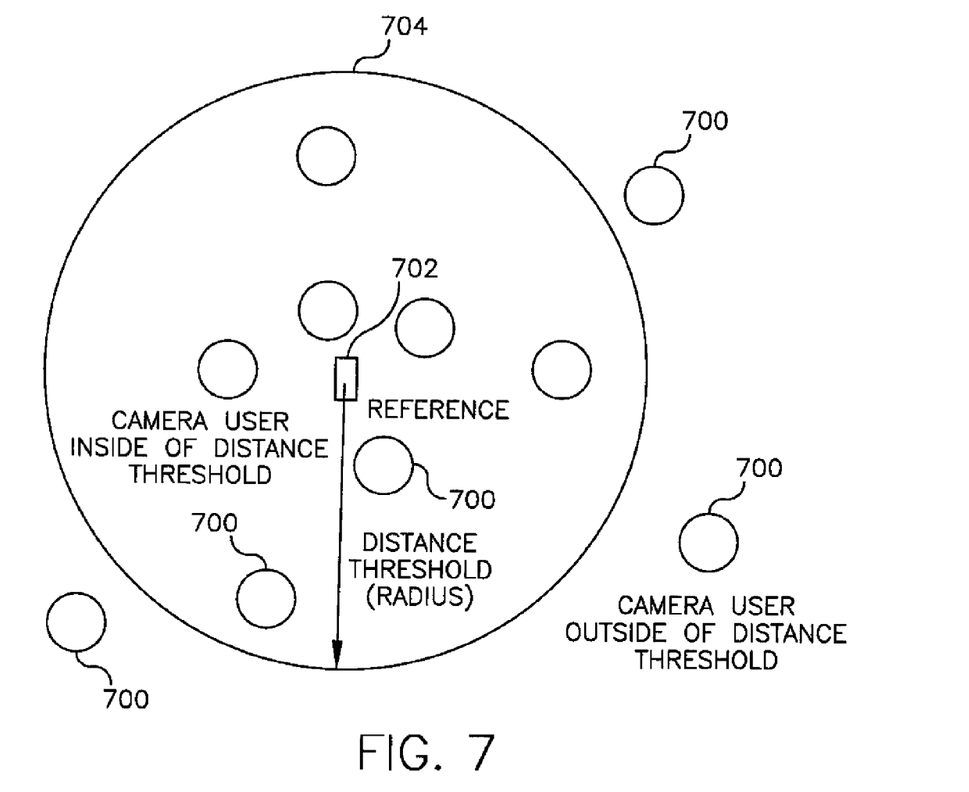
FIG. 7 is a diagram of classification of images into events using an embodiment of the method of FIG. 1, in which grouping values are distances from a reference.

Referring now to FIG. 7, the method is applicable to a problem domain, in which grouping values are geographic. Grouping, in this case, is by distance of an independently operated camera 700 from a reference 702 at the time of image capture. The scaled histogram for an example set of images is similar to FIG. 5. The horizontal axis (labelled "grouping value") represents relative distance or a radius from the reference. The threshold is a circle 704. For example, this embodiment of the method can be used to delimit group boundaries for a set of images captured by different photographers using a plurality of cell phone cameras or other mobile capture devices capable of recording GPS coordinates as image metadata. The GPS coordinates are reduced to distances from a reference location or user. The images are grouped based upon the individual photographer's roaming relative to a central location or reference user. As a more specific example, a number of spectators capture still/video images of a golf tournament covering different players. The pictures/video captured by the spectators can then be grouped, based upon distances. With available communications links, the images assigned to different groups can be shared automatically, with the result that all of the spectators can benefit from being able to view what is happening at other sites simultaneously during the tournament. As a result of the method, the sites shown in grouped images do not have to be predefined and can vary during the course of the tournament, particularly if the reference is movable.

Figure 6:
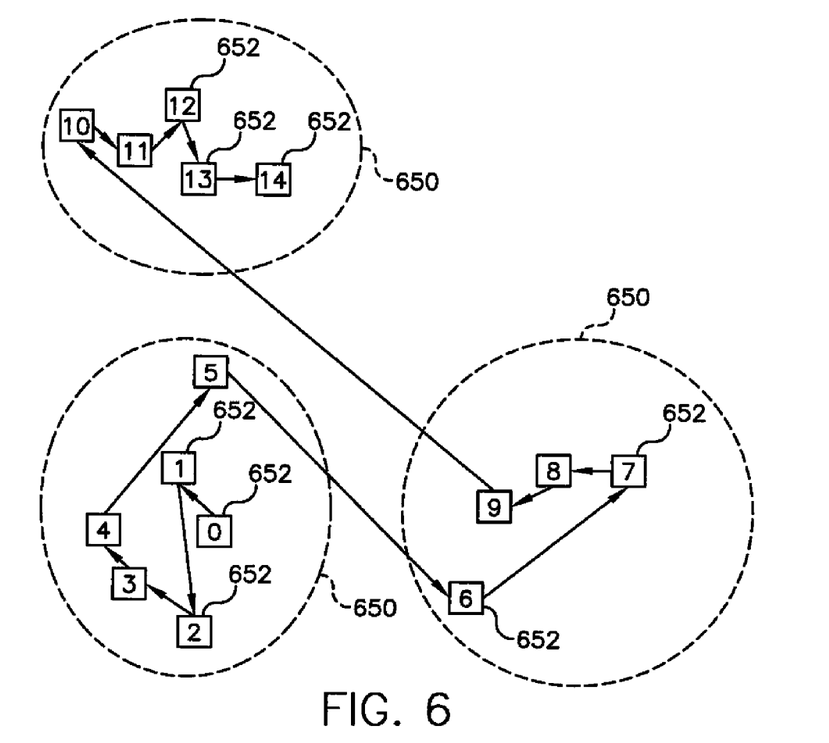
FIG. 6 is a diagram of classification of images into events using an embodiment of the method of FIG. 1, in which grouping values are distances between successive images.

Referring now to FIG. 6, the method is applicable to a problem domain, in which grouping values include chronological information and geographic information. In this case, the grouping values are distances (indicated by arrows in FIG. 6) between successive images in time sequence of image capture. Groups are defined by distance boundaries 650 about groups of images 652 and are comparable to the event boundaries earlier discussed. The scaled histogram and method steps are like those of earlier discussed embodiments. Table 1 is an example of grouping values for a time sequence of images. The left column represents the order of the images captured, and the right column represents the distance between an image i and image i+1.

TABLE 1

| Image number | distance (meters) |
|---|---|
| 0 | 10 |
| 1 | 42 |
| 2 | 19 |
| 3 | 6 |
| 4 | 79 |
| 5 | 693 |
| 6 | 21 |
| 7 | 5 |
| 8 | 9 |
| 9 | 1314 |
| 10 | 3 |
| 11 | 10 |
| 12 | 18 |
| 13 | 12 |

The images are divided into groups between the 5th and 6th and 9th and 10th images. FIG. 6 illustrates this in a graphical manner. The corresponding scaled distance histogram is similar to FIG. 5. In this embodiment, an additional grouping threshold would defines subgroups within groups defined by the grouping threshold.

Figure 10:
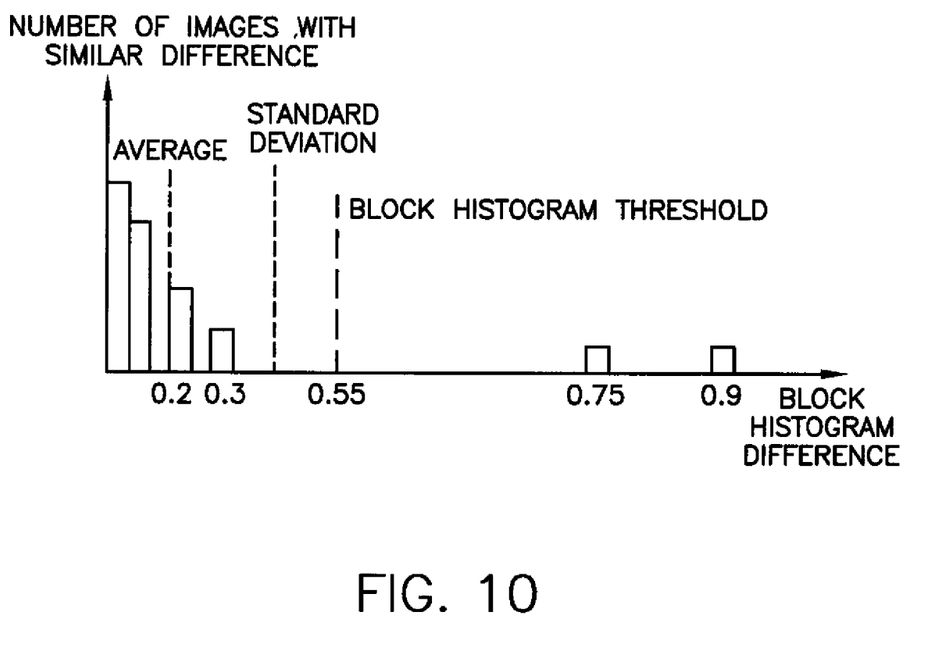
FIG. 10 is a diagram showing a scaled histogram of block histogram differences of a set of images and, imposed on the histogram, the average, standard deviation, and block histogram threshold.

The grouping values can be a measure of image content, such as image contrast, dynamic range, and color characteristics. Referring now to FIG. 10, another image content based grouping value is block histogram differences of chronologically ordered images. In this case, the horizontal axis of the graph represents the block histogram difference, which is a measure of relative difference (or dissimilarity) of two successive chronologically ordered images. The block histogram difference between pair of images within an event will be small, whereas the corresponding difference between a pair of images at the event boundary will be relatively large. Block histogram differences can also be used with data ordered in another way or with non-ordered data.

The block histogram difference is conveniently provided as the remainder after subtracting a block histogram similarity from unity (or another value associated with identity). Block histogram similarity can be determined in ways known to those of skill in the art, such as the procedure described in U.S. Pat. No. 6,351,556, which is hereby incorporated herein by reference.

In the embodiment of FIG. 10, the block histogram difference is represented by the equation:

block histogram difference=1−Inter(R,C)

where Inter (R,C) is the histogram intersection equation:

$$Inter(R, C) = \frac{\sum_{i=1}^{n} \min(R_i, C_i)}{\sum_{i=1}^{n} R_i}$$

where R and C are two successive images (also referred to as a reference image and a candidate image, respectively), and n is the number of bins in the histogram.

Figure 2:
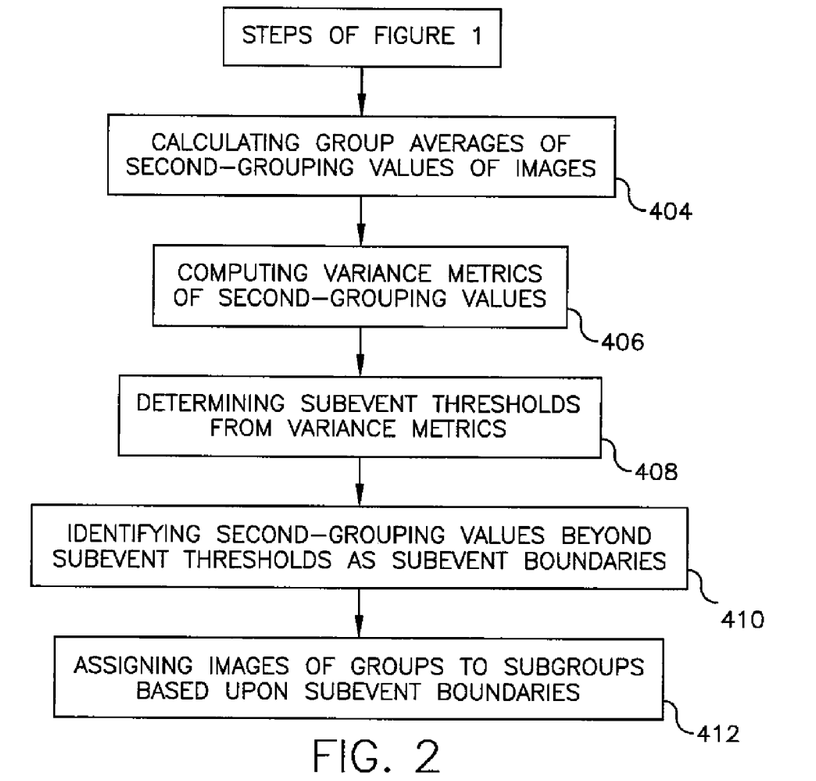
FIG. 2 is a flow chart of another embodiment of the method of the invention.

Referring to FIGS. 2 and 4, the method of the invention can be used iteratively to provide subgroupings within previously determined groups or subgroups. Calculating (404), computing (406), determining (408), identifying (410), and assigning (412) steps in FIG. 2 correspond to steps in FIG. 1 having reference numbers differing by 200. FIG. 4 illustrates a grouping of a set of images 300 at an event threshold 302 into two events 304,306, followed by subgrouping of one event 306 into sub-event a 308 and sub-event b 310.

Each iteration can use a different set of grouping values for the images. (For simplicity, levels provided by each iteration are referred to herein as "subgroups", meaning that the groups provided at that level are within an earlier determined group or subgroup. For convenience, the grouping values used to provide subgroupings are distinguished by the prefix, "second-grouping values".) For example the method can initially be used to group images by time, and then those groups can be subgrouped by distance. Similarly, a grouping value can be related to time and/or distance and a second-grouping value can be block histogram differences or another measure of image content.

Table 2 lists examples of various combinations for detecting events and sub-events in an image set.

TABLE 2

| To detect | Time difference clustering | Distance difference clustering | Block histogram difference clustering |
|---|---|---|---|
| Events | X | | |
| Events | | X | |
| Events and sub-events | X (1) | | X (2) |
| Events and sub-events | | X (1) | X (2) |
| Events and sub-events | X (1) | X (2) | |
| Events and sub-events | X (2) | X (1) | |
| Events, sub-events and further sub-events | X (1) | X (2) | X (3) |
| Events, sub-events, and further sub-events | X (2) | X (1) | X (3) |

In Table 2, "X(n)" denotes the order of applying the different algorithms.

Figure 3:
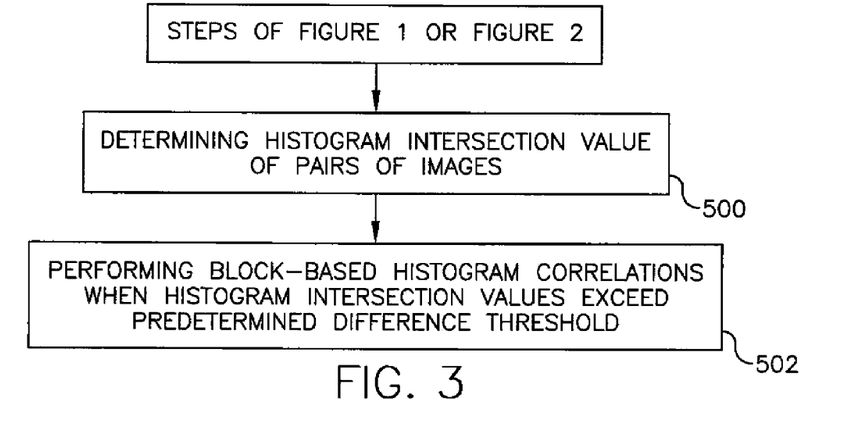
FIG. 3 is a flow chart of still another embodiment of the method of the invention.

The method can also be used with other grouping methods particularly grouping methods that use information other than that previously used. For example, the method can be used to detect events of a collection of images using time difference clustering preceded or followed by an alternative clustering method using another method such as block histogram clustering or two-means clustering (disclosed in U.S. Pat. No. 6,606,411 and U.S. Pat. No. 6,351,556, which are both hereby incorporated herein by reference). Referring to FIG. 3, block histogram clustering is an example of a clustering technique, in which the content of images is analyzed and images are assigned to subsets (groups or subgroups) responsive to that analyzing. Block histogram intersection values are determined (500) for pairs of images. Block-based histogram correlations are performed (502) when histogram intersection values exceed a predetermined difference threshold.

The invention has been described in detail with particular reference to certain preferred embodiments thereof, but it is understood that variations and modifications can be effected within the spirit and scope of the invention.

The invention claimed is:

1. An image classification method in a digital image processing system for automatically classifying a plurality of captured digital images, the method comprising using a digital image processor to perform the steps of:
 receiving a plurality of digital images to be classified, each digital image having associated geographic image capture metadata;
 determining a first grouping value according to the associated geographic image capture metadata for each of the plurality of digital images to be classified;
 defining the first grouping value for each digital image as a distance between the geographic image capture metadata for each digital image and a relative geographic reference point;
 calculating an average of said determined first grouping values;
 computing a variance metric of said first grouping values, relative to said average;
 determining from said variance metric a first grouping threshold applicable to said first grouping values;
 identifying first grouping values beyond said first grouping threshold as group boundaries;

assigning said digital images to a plurality of digital image groups based upon said group boundaries;

determining a second grouping value for each of the plurality of digital images to be classified;

calculating as to one or more of said digital image groups, a group average of said second-grouping values of respective said digital images;

computing a variance metric of respective said second-grouping values relative to each said average;

determining from each said variance metric a respective second-grouping threshold applicable to the respective said digital image group;

identifying ones of said second-grouping values beyond respective said second-grouping thresholds as subgroup boundaries of respective said digital image groups; and assigning said digital images of each of said one or more digital image groups to a plurality of subgroups based upon respective said subgroup boundaries.

2. The method of claim 1 wherein said receiving further comprises capturing said digital images using a plurality of independently operated cameras.

3. The method of claim 1 wherein said average is an arithmetic mean.

4. The method of claim 1 wherein said second-grouping values are time differences.

5. The method of claim 1 wherein said second-grouping values are based upon image content.

6. The method of claim 1 wherein said second-grouping values are block histogram differences.

7. The method of claim 1 further comprising, prior to said computing of said average, difference scaling said grouping values, wherein relatively large values are reduced and relatively small values are retained.

8. The method of claim 1 wherein said variance metric is one of standard deviation, variance, mean deviation, and sample variation.

9. An image classification method in a digital image processing system for automatically classifying a plurality of captured digital images, the method comprising capturing a plurality of digital images and using a digital image processor to perform the steps of:

receiving a grouping value for each of the plurality of captured digital images;

calculating an average of said grouping values;

computing a variance metric of said grouping values, relative to said average;

determining from said variance metric a grouping threshold applicable to said grouping values;

identifying grouping values beyond said grouping threshold as group boundaries;

assigning said digital images to a plurality of digital image groups based upon said group boundaries; and wherein said grouping threshold is expressed by the equation:

$$\text{event threshold} = 0.2 + 8.159 e(-0.0002 * (s^2))$$

where e is the natural logarithm, and s is the standard deviation of said grouping values.

* * * * *